(12) United States Patent
Suter et al.

(10) Patent No.: US 11,944,932 B2
(45) Date of Patent: Apr. 2, 2024

(54) HIGH THROUGHPUT DIRECT AIR CAPTURE DEVICE AND METHOD OF ITS OPERATION

(71) Applicant: CLIMEWORKS AG, Zurich (CH)

(72) Inventors: Roger Suter, Zurich (CH); Benjamin Megerle, Zurich (CH); Nicolas Repond, Zurich (CH); Christoph Gebald, Zurich (CH); Jan André Wurzbacher, Zurich (CH)

(73) Assignee: CLIMEWORKS AG, Zurich (CH)

( * ) Notice: Subject to any disclaimer, the term of this patent is extended or adjusted under 35 U.S.C. 154(b) by 212 days.

(21) Appl. No.: 17/441,375

(22) PCT Filed: Apr. 1, 2020

(86) PCT No.: PCT/EP2020/059282
§ 371 (c)(1),
(2) Date: Sep. 21, 2021

(87) PCT Pub. No.: WO2020/212146
PCT Pub. Date: Oct. 22, 2020

(65) Prior Publication Data
US 2022/0176310 A1    Jun. 9, 2022

(30) Foreign Application Priority Data
Apr. 18, 2019 (EP) ..................... 19170232

(51) Int. Cl.
*B01D 53/04* (2006.01)
*B01D 53/047* (2006.01)

(52) U.S. Cl.
CPC ..... *B01D 53/0476* (2013.01); *B01D 53/0415* (2013.01); *B01D 53/0438* (2013.01);
(Continued)

(58) Field of Classification Search
CPC ............... B01D 53/04; B01D 53/0476; B01D 53/0415; B01D 53/0446; B01D 53/0438;
(Continued)

(56) References Cited

U.S. PATENT DOCUMENTS 3,774,374 A * 11/1973 Dufour ................. F24F 3/1423
                                                     96/112
3,857,545 A    12/1974 Santi
(Continued)

FOREIGN PATENT DOCUMENTS

CN    205598857 U    9/2016
CN    106422651 A    2/2017
(Continued)

OTHER PUBLICATIONS

Machine-generated English translation of WO 2013-115143 A1, published Aug. 2013.*
(Continued)

Primary Examiner — Frank M Lawrence, Jr.
(74) Attorney, Agent, or Firm — Sughrue Mion, PLLC

(57) ABSTRACT

Separation unit (1) for separating at least one gaseous component from a gas mixture, or arrangement of such separation units, wherein it comprises at least one circumferential wall element(s) (5), said circumferential wall element(s) defining an upstream opening (31) and an opposed downstream opening (32) of at least one cavity (3) containing at least one gas adsorption structure (4) for adsorbing said gaseous component under ambient pressure and/or temperature conditions, or an array of at least two such cavities (3), wherein the separation unit (1) comprises a pair of opposing sliding doors (12) for sealing the openings of a cavity (3) and preferably allowing for evacuating a cavity (3), and wherein the pair of opposing sliding doors (12) can be shifted in a direction essentially parallel to the plane of
(Continued)

the respective sliding door (12) and to allow for flow through of gas mixture through the gas adsorption structure (4).

29 Claims, 8 Drawing Sheets

(52) U.S. Cl.
CPC .... *B01D 53/0446* (2013.01); *B01D 2257/504* (2013.01); *B01D 2257/80* (2013.01); *B01D 2259/402* (2013.01)

(58) Field of Classification Search
CPC .............. B01D 53/0462; B01D 53/047; B01D 2257/504; B01D 2257/80; B01D 2258/06; B01D 2259/402; B01D 2259/40003; Y02C 20/40
USPC ........ 95/90, 96, 114, 115, 117, 139; 96/121, 96/122, 126–128, 130, 143, 144, 146, 152
See application file for complete search history.

(56) References Cited

U.S. PATENT DOCUMENTS

| | | | |
|---|---|---|---|
| 5,514,205 A * | 5/1996 | Awaji | B01D 46/30 55/516 |
| 6,197,097 B1 * | 3/2001 | Ertl | F24F 8/108 96/129 |
| 6,358,374 B1 * | 3/2002 | Obee | B01D 53/0415 204/157.3 |
| 6,878,186 B2 | 4/2005 | Neary | |
| 7,992,409 B1 | 8/2011 | Cooper | |
| 8,034,164 B2 | 10/2011 | Lomax, Jr. et al. | |
| 11,358,091 B2 * | 6/2022 | Dellea | B01D 53/82 |
| 2005/0005609 A1 | 1/2005 | Coleman et al. | |
| 2010/0289299 A1 * | 11/2010 | Kitayama | E05D 15/1047 49/213 |
| 2011/0296872 A1 | 12/2011 | Eisenberger | |
| 2012/0174779 A1 | 7/2012 | Eisenberger | |
| 2015/0157030 A1 | 6/2015 | Giger et al. | |
| 2015/0336044 A1 | 11/2015 | Keith, II et al. | |
| 2017/0106330 A1 | 4/2017 | Gebald et al. | |
| 2017/0326494 A1 | 11/2017 | Gebald et al. | |
| 2019/0299152 A1 * | 10/2019 | Alexander | F16K 11/052 |
| 2020/0217525 A1 * | 7/2020 | Maeda | F24F 3/1411 |
| 2023/0233989 A1 * | 7/2023 | McGrail | E03B 3/28 34/282 |

FOREIGN PATENT DOCUMENTS

| | | | |
|---|---|---|---|
| EP | 0 864 819 A2 | 9/1998 | |
| EP | 2 782 657 A2 | 10/2014 | |
| FR | 1 148 736 A | 12/1957 | |
| GB | 621195 A | 4/1949 | |
| GB | 2 420 711 A | 6/2006 | |
| JP | 2008-200627 A | 9/2008 | |
| JP | 2009-172479 A | 8/2009 | |
| KR | 10-2011-0095014 A | 8/2011 | |
| WO | 2013/075981 A2 | 5/2013 | |
| WO | 2013/115143 A1 | 8/2013 | |
| WO | 2013/117827 A1 | 8/2013 | |
| WO | WO-2013115143 A1 * | 8/2013 | ............ F24F 3/1429 |
| WO | 2013/166432 A1 | 11/2013 | |
| WO | 2015/185434 A1 | 12/2015 | |
| WO | 2016/005226 A1 | 1/2016 | |
| WO | 2017009241 A1 | 1/2017 | |
| WO | 2018/083109 A1 | 5/2018 | |
| WO | 2019/092128 A1 | 5/2019 | |

OTHER PUBLICATIONS

International Search Report for PCT/EP2020/059282 dated Jun. 8, 2020 (PCT/ISA/210).
Written Opinion for PCT/EP2020/059282 dated Jun. 8, 2020 (PCT/ISA/237).

* cited by examiner

HIGH THROUGHPUT DIRECT AIR CAPTURE DEVICE AND METHOD OF ITS OPERATION

CROSS REFERENCE TO RELATED APPLICATIONS

This application is a National Stage of International Application No. PCT/EP2020/059282 filed Apr. 1, 2020, claiming priority based on European Patent Application No. 19 170 232.3 filed Apr. 18, 2019.

TECHNICAL FIELD

The present invention relates to a new high throughput device for gas separation in particular for direct air capture, such as $CO_2$ capture from air, providing in particular large flow through cross sections, low pressure drops, low thermal mass, little/few structural parts and high efficiency. Also provided is a method for the operation of such devices as well as parts of such devices, such as a novel movable door systems for sealing of gas separation structures.

PRIOR ART

Gas separation by adsorption has many different applications in industry, for example removing a specific component from a gas stream, where the desired product can either be the component removed from the stream, the remaining depleted stream, or both. Thereby both trace components as well as major components of the gas stream can be targeted by the adsorption process. One important application is capturing carbon dioxide ($CO_2$) from gas streams, e.g., from flue gases, exhaust gases, industrial waste gases, or atmospheric air. Capturing $CO_2$ directly from the atmosphere, referred to as direct air capture (DAC), is one of several means of mitigating anthropogenic greenhouse gas emissions and has attractive economic perspectives as a non-fossil, location-independent $CO_2$ source for the commodity market and for the production of synthetic fuels.

One particular approach for DAC is based on a cyclic adsorption/desorption process on solid, chemically functionalized sorbent materials. For example, in WO-A-2016005226 and WO-A-2017009241 processes based on cyclic adsorption/desorption assisted with steam and a suitable amine functionalized sorbent material respectively are disclosed for the extraction of carbon dioxide from ambient atmospheric air. Further WO 2019/092128 describes another class of sorbent materials based on potassium carbonate functionalization also suitable for cyclic $CO_2$ adsorption/desorption processes.

The adsorption process normally takes place at ambient atmospheric conditions at which air is streamed through the sorbent material and a portion of the $CO_2$ contained in the air is chemically and/or physically bound/adsorbed at the surface of or within the adsorbents.

During subsequent $CO_2$ desorption, the adsorbent material is normally heated and, optionally, the partial pressure of carbon dioxide surrounding the sorbent can be reduced (PSA—Pressure Swing Adsorption) by applying a vacuum or exposing the sorbent to a purge gas flow, such as but not limited to steam. Thereby, the previously captured carbon dioxide is removed from the sorbent material and obtained in a concentrated form.

One of the main challenges for the energy and cost efficient realization of DAC arises from the low concentration of $CO_2$ in atmospheric air (nominally around 400 ppm as of 2019) and the delivery of the correspondingly necessary large volumes of atmospheric air to a suitable gas separation structure. Suitable gas separation structures containing enclosed sorbent material have been presented in US2017/0326494 and WO-A-2018083109 and can be applied to batch wise adsorption-desorption processes in which said structure containing sorbent material needs to be alternately exposed to a high-volume flow air stream (adsorption/contacting) and then to desorption conditions characterized by elevated temperatures and/or vacuum pressures down to e.g. 10 mbar(abs). This requires chamber structures which on the one hand allow the sorbent material to be exposed to a high-volume flow of atmospheric air to adsorb $CO_2$ and which can on the other hand appropriately seal the sorbent material from the ambient air during desorption and withstand sorbent material temperatures up to 130° C., mixtures of $CO_2$, air, and water as vapor and liquid, as well as optionally, vacuum pressures down to 10 mbar(abs) or lower (if vacuum is required for the desorption). One such suitable structure is the unit disclosed in WO-A-2015185434. In general, particularly advantageous therefore is infrastructure which firstly minimizes pressure drop during adsorption flow through and secondly attributes the greatest portion of said pressure drop to the portion of the unit actually capturing $CO_2$.

In the prior art there are many examples of cyclic adsorption/desorption processes which are typically conducted in long, narrow, thick wall columns with small flow cross sections. Said devices are used for pressure and/or vacuum swing based gas separation and are typically operated with very short cycle times in the order of seconds to a few minutes, during which their thermal mass or thermal inertia does not play a major role. Further, the devices are typically subjected to high pressure flows with high adsorbate concentrations and can thus use openings and flow conduits significantly smaller than their cross section as pressure drops over said features are relatively small. For example, U.S. Pat. No. 8,034,164 relates to multiple pressure swing adsorption columns operating in parallel and discloses details to column construction and assembly, details to control of flows and cycle optimization. U.S. Pat. No. 6,878,186 refers to a method and apparatus for pure vacuum swing desorption in a classical adsorption column, and to processes and apparatuses of classical adsorption columns. Certain prior art systems such as WO-A-2013117827 describe a gas separation structure based on parallel passages which indeed seek to reduce the pressure drop while being contained in a cylindrical pressure vessel for PSA processes.

If vacuum is used for the desorption step, there is the problem of pressure drop over gas control structures at the inlet and outlet. A number of prior art systems disclose large actuated swinging lids which are further designated as flaps or dampers, with said units not typically designed for pressure differences higher than about 0.2 bar. Certain isolation valves are specifically suited to vacuum applications but must have a significant material thickness and are limited in sizes to handle the large forces of vacuum application. In consequence, such valves have a high thermal mass when applied to alternating heating/cooling steps and cannot offer the necessary through flow area. Further certain prior art systems may have actuating mechanisms. EP-0 864 819 discloses a rotating flap valve for a fume hood built into ducting for use in ventilation applications but unsuitable for vacuum. US2005/005609 relates to a bypass/redirection damper (valve) for gas turbine applications but unsuitable for vacuum. GB-A-621195 discloses a curved vacuum lid, which seeks to reduce the material thickness, but is incompatible with the requirement of minimum pressure drop over the flow cross section due to the effective thickness of the lid in the ducting. FR-A-1148736 and U.S. Pat. No. 3,857,545 propose actuated vacuum lids and valves through which a vessel may be evacuated but are unsuitable to the many thousands of times larger airflows required in a DAC application.

A specific DAC vessel solution with a swinging lid is again found in WO-A-2015185434 however herein flow restrictions may decrease output. Some prior art systems for contacting and regeneration of solid sorbent material in DAC applications involve transferring the sorbent material and gas separation structure between a first region of air flow for adsorption and a second region in the form of a chamber for regeneration as illustrated in US 2012/0174779, US 2011/0296872 and WO-A-2013166432.

JP-A-2009172479 provides a carbon dioxide remover, which can efficiently adsorb carbon dioxide from the atmosphere and also, can eliminate the carbon dioxide only by slight heating. The proposed carbon dioxide remover is equipped with a carbon dioxide adsorption film of a perovskite structure with an exposure surface to the atmosphere containing carbon dioxide molecules, a heater for heating the carbon dioxide adsorption film, and an exhauster for exhausting the space around the carbon dioxide adsorption film. The carbon dioxide adsorption film performs a chemical adsorption of the carbon dioxide molecule from the atmosphere, and the heater causes the carbon dioxide molecule adsorbed by the carbon dioxide adsorption film to be released.

SUMMARY OF THE INVENTION

It is therefore the object of the present invention to provide for an improved structure for gas separation processes, in particular for DAC processes, which has as little/few components as possible, is easy to operate, allows for efficient gas separation processes and which is highly reliable under long term use.

Accordingly, the present invention proposes a separation unit, as well as an arrangement of separation units, as claimed, and a method of operating such a separation unit or an arrangement of such separation units, and uses of these elements, in particular for DAC processes.

More specifically, the present invention proposes a separation unit for separating at least one gaseous component from a gas mixture containing that component, preferably suitable and adapted to separate carbon dioxide and/or water vapor from ambient air.

The proposed separation unit comprises at least one contiguous and sealing circumferential wall element, circumferentially enclosing at least one cavity and defining an upstream opening and an opposed downstream opening of that at least one cavity. The device is built such that the gas mixture in the adsorption phase passes though the upstream opening, then transversely through the interior of the cavity and through or past a gas adsorption structure located in the cavity, and to then exit again by passing through the downstream opening, the whole air flow being preferably essentially linear except for turbulences and deflections in or at the gas adsorption structure.

The at least one cavity can preferably be of rectangular or square cross section, in which case a set of four contiguous and sealing circumferential wall elements is provided, a lower wall element, an opposed upper wall element and two opposed lateral circumferential wall elements joining corresponding ends of the upper and lower wall element, and circumferentially enclosing the cavity. Said set of four contiguous and sealing circumferential wall elements is defining an upstream opening and an opposed downstream opening of the cavity.

In case of adjacent cavities of the separation unit in an array, adjacent walls of neighboring cavities can be formed by wall elements common to the neighboring cavities.

When defining a lower wall element and an opposed upper wall element this does not imply that the respective cavity has to be oriented with a horizontal flow through direction. It may also be oriented under an angle with the horizontal direction or the flow through direction may also be vertical. The lower wall element and the opposed upper wall element are to be understood along a viewing direction along the main flow through direction through the cavity as generally the two wall elements joining the two lateral circumferential wall elements.

The at least one cavity can also be of polygonal cross section, e.g. it may comprise a set of eight contiguous and sealing circumferential wall elements, at least one lower wall element, at least one opposed upper wall element and at least two opposed lateral circumferential wall elements joining corresponding ends of the upper and lower wall element directly or via oblique further wall elements, preferably in this case forming an hexagonal structure, and circumferentially enclosing a cavity, said set of eight contiguous and sealing circumferential wall elements defining the upstream opening and the opposed downstream opening of the cavity.

The proposed principle can be applied to any polygonal or round flow through cross sectional shape being defined by an essentially cylindrical contiguous and sealing circumferential wall element or set of wall elements forming the respective cavity. Possible are e.g. triangular, rectangular, quadratic, pentagonal, hexagonal, octagonal cross sectional shapes.

Also round structures are possible. In this case the at least one cavity comprises one single circular or oval circumferential wall element.

Said at least one cavity contains or at least allows containing at least one gas adsorption structure for adsorbing said at least one gaseous component, preferably under ambient pressure and/or temperature conditions. If the separation unit contains more than one cavity, for example in an array, each cavity contains or may contain at least one individual gas adsorption structure of that kind.

In accordance with the present invention, the separation unit comprises a pair of opposing sliding doors for sealing the upstream opening and the downstream opening, respectively, of at least one cavity in a closed state thereof. The pair of opposing sliding doors seals, if there is just one cavity, this cavity. If there is provided more than one cavity, the pair of opposing sliding doors can at the same time also seal more than one of (but not necessarily all of) these cavities at a time.

Typically, the pair of opposing sliding doors is mounted so as to synchronously open and close cavities depending on the operational status.

In case of more than one cavity being part of the separation unit, for example in case of an array of cavities, the pair of opposing sliding doors is preferably mounted to alternatingly close one cavity at a time only and then to be shifted to a next cavity, and so on, preferably in a cyclic manner as will be detailed further below. In such an array, said pair of opposing sliding doors can also be mounted to allow for a position in which no cavity is sealed and preferably all cavities are available for flow-through or other functions which do not require sealing by said pair of opposing sliding doors, as will be detailed further below.

To open the at least one cavity, the pair of opposing sliding doors can be shifted in a direction essentially parallel to the plane of the respective sliding door to uncover the upstream and downstream opening, respectively and to allow for flow through of gas mixture through the respective cavity and the gas adsorption structure located therein. To release a corresponding sealing mechanism, the sliding motion of the door may involve phases in which the door is lifted away from the corresponding opening in addition or concomitant to the sliding.

Sliding sealing door mechanisms as such are known from other applications, however not from the field of gas separation processes, and never for this particular setup where there is provided not one but rather a pair of opposing parallel sliding doors acting as sealing doors for a cavity having an upstream and downstream opening. As a matter of fact, known from these other fields and applications are doors of sealing mechanisms for example in US2015/0157030, GB-A-2420711 and KR-A-20110095014 wherein in each case a single sliding door can alternatively isolate and provide access to a vacuum cavity and in the open state afford a fully unimpeded cross section. These systems however are not designed for passing a gas flow transversely through the vacuum cavity and lack correspondingly a second such door and a means of driving gas flow.

The proposed separation unit in particular allows to provide for an array of cavities as will be described further below, in which one single pair of sliding doors is used for alternatingly closing and opening adjacent cavities containing adsorption structures, and allowing for cyclic operation of adjacent cavities. An appropriate number of cavities can be combined in such an array, inter-alia depending on the temporal distribution between adsorption and desorption. If e.g. the ratio between the two phases is 2:1, a structure in the form of a separation unit containing an array of three cavities and one pair of opposing sliding doors mounted so as to alternatingly close one of the cavities in the array for the desorption steps while the other two cavities in the array are subjected to transverse flow-through of air and/or gas mixture and the adsorption process.

In a further embodiment of the invention, the sliding doors can move into a position outside of the array of cavities containing adsorber structures. In case of such a 'neutral' position the temporal distribution of the adsorption-desorption process is uncoupled from the geometric constructional arrangement of the cavities and array, as the doors may be placed in this position if no closing of a cavity is needed, thus allowing for any desorption and adsorption timing. Placement of this 'neutral' position to the bottom or the side of such an array of cavities will further provide a safe position for the doors to be held while commissioning, maintenance or other work is conducted on the adsorption structures within the array.

So in case of an array of cavities, the pair of sliding doors can be positioned adjacent to the array of cavities or in a slot between cavities in such a way as to not seal any cavity and that all cavities are open to through flow of the gas mixture, and the sliding doors can subsequently be moved to a cavity which has been exposed to gas mixture adsorption for the longest time span, to seal that next cavity, and then this cavity is exposed to conditions so as to desorb and extract the gaseous component requiring desorption as necessary, or for the sliding doors to remain at the adjacent position to allow for commissioning, maintenance or other work on the entire structure or array of cavities.

Preferably, the separation unit allows for evacuation of the cavity, which is then a vacuum cavity, to a pressure of less than 700 mbar(abs) or less than 500 mbar(abs), preferably to a pressure of less than 300 mbar(abs) or to a pressure of less than 150 mbar(abs) or at most 100 mbar(abs). Preferably the separation unit in a closed state allows evacuating the cavity to a pressure in the range of 500-10 mbar(abs).

Further preferably, the separation unit allows exposure of the cavity to an overpressure (typically relative to normal outside pressure of 1.01325 bar) of up to +0.1 bar(g) or up to +0.2 bar(g) or +0.5 bar(g).

According to a preferred embodiment of the proposed separation unit, the upper and lower wall elements of the at least one cavity are arranged parallel to each other, the lateral wall elements are arranged parallel to each other, and preferably also the pair of opposing sliding doors is arranged parallel to each other.

The separation unit may furthermore comprise, at the upstream opening of at least one cavity containing adsorption structures, or in case of more than one cavity of the multitude of cavities that contain adsorption structures, an inlet gas plenum, in which an upstream sliding door is located, and at the downstream opening an outlet gas plenum, in which a downstream sliding door is located.

Preferably in case of more than one cavity containing adsorption structures, the inlet gas plenum and/or the outlet gas plenum are common to all cavities.

Preferably upstream of the inlet gas plenum or forming the entry of the inlet gas plenum one or a set of preferably movable louvres and/or at least one gas or air propelling device is provided, and/or downstream of the outlet gas plenum or forming the outlet of the outlet gas plenum, preferably in an outlet manifold at least one gas or air propelling device, preferably in the form of a fan, is mounted and/or a set of preferably movable louvres is provided.

One or both sliding doors can be mounted on a pair of upper and lower rails, or can be mounted on a pair of rails at opposing lateral sides of the unit. The rails can be C rails. Preferably the doors are travelling in or on these rails with rollers, and wherein further preferably means are provided which can press the respective door to a corresponding axial face of the respective opening at the position for closing in particular with the aim of generating a seal, and to distance the door again from that sealing position to allow for sliding the door to free the respective opening and wherein further the upper and lower rails on which the door travels (or the lateral rails in case of doors moving up and down) can extend beyond the array dimensions to allow the door to pass into to the above-mentioned neutral position.

The sliding door and/or the respective opening the cavity (ies) can be provided with at least one circumferential sealing element, preferably in the form of at least one sealing ring and/or in the form of a sealing coating.

The means to allow pressing of the respective door to a corresponding axial face and to free the respective opening to distance the door again can for example be provided by the pair of upper and lower rails being mounted on a frame or the circumferential walls in an axially shiftable manner, preferably by way of pneumatic drive.

Preferably, the pair of sliding doors is driven each or jointly by a belt, for example mounted on a pair of pulleys.

The axial length of the circumferential wall, i.e. the length of the wall in the flow-through direction of the at least one cavity, is preferably smaller than the minimum distance of opposing circumferential wall elements.

The circumferential wall may enclose a rectangular or square cross section and the pair of sliding doors is correspondingly rectangular or square.

The sliding drive of the pair of doors can be built to allow (only) synchronous pairwise parallel movement of the doors.

The separation unit may furthermore comprise at least one stabilizing element, preferably in the form of at least one stabilizing strut, at or in at least one or preferably all of the cavities, to make sure that the structure is sufficiently strong to withstand, if desired, the vacuum or overpressure conditions. For the same purpose at least one, preferably both sliding doors may comprise stabilizing elements, preferably in the form of ribbing, preferably on the outer side with respect to the cavity.

As pointed out above, according to a particularly preferred other aspect of the invention it relates to a separation unit not with only one but with more than one cavities, preferably with an array of cavities, i.e. containing at least two, preferably at least three, or at least four or in the range of 2-8 or 2-6 cavities with circumferential wall elements enclosing the cavities and each housing respective gas adsorption structures. Typically then said pair of opposing sliding doors is mounted to allow for alternatingly sealing one cavity of the separation unit as well as successively the other cavity(ies). Preferably said pair of opposing sliding doors is mounted in such an array to allow for a position in which no cavity is sealed and preferably all cavities are available for flow-through or other functions which do not require sealing by said pair of opposing sliding doors.

The cavities in such an array can have any of the cavity structures as detailed above, i.e. can have a cross-sectional shape which is rectangular, triangular, square, hexagonal, octagonal or round, and preferably all cavities of the separation unit have the same cross-sectional shape and dimension to allow for sealing each of them with the same pair of opposing sealing doors alternatingly.

One benefit of this solution against the current state of the art is that the infrastructure of the pair of opposing movable sealing doors can be utilized for many cavities allowing for cost savings and improvements in reliability against multiple doors or lids. Further compared to prior art inventions which move the gas separation structure into and out of regeneration chambers, the complexity and sensitivity of the moving element is far lower thereby reducing risk. Further still, in regeneration methods utilizing a thermal swing, the doors remain hot when moved between regenerating cavities thereby reducing the effective thermal mass of the regeneration and therefore the energy demand. Yet another surprising benefit of this invention against the devices of the prior art applied to pressure and temperature swing processes is the amount of structural cavity material per unit enclosed volume, which due to the common separation walls, the common door and mutually stabilizing circumferential walls is significantly lower in this invention than any prior art device and leads to significant cost, complexity and energy savings in thermal swing processes. Finally, compared to the prior art flow through applications, the clear benefit of the invention is that the complete cross section of the cavity is available as flow through area without impediments common to flaps, lids, valves or other flow restrictions. Correspondingly, given an allowable pressure drop 'budget', this complete value can be applied to the gas adsorption structure held in the cavity through which the gas flow must pass resulting in higher volume gas flows and in application of gas separation a higher uptake rate of the relevant species.

In such an array the cavities of the array can be arranged adjacent to each other in one or more rows, and circumferential wall elements of adjacent cavities can be formed by common separation walls. Preferably the cavities of the array are arranged in one single horizontal or vertical row and directly adjacent to each other.

Such an array of cavities is preferably attached to or encompasses only one common evacuation unit, and/or only one common heating unit, and/or only one common collection unit for the gaseous component, and/or only one common drive at the upstream side and the downstream side for the doors, and/or only one set of louvres at the upstream side, in each case common for all cavities, while preferably for each cavity an individually controllable air propelling device is provided at the upstream and/or downstream side.

Typically, such an array of cavities contains one single frame forming the circumferential wall elements of all cavities.

As pointed out above, according to a particularly preferred aspect of the invention it relates to an arrangement of two separation units as detailed above, wherein two separation units are arranged in a V orientation, the respective upstream openings facing downwards or in an oblique downwards/sideward direction and the respective downstream openings facing upwards or in an oblique upwards/sideward direction and facing in an oblique way each other, and at least one or a pair of gas or air propelling devices preferably being arranged to propel the gas mixture travelling through the separation units in a vertically upward direction.

The separation unit can thus be oriented in a downward direction with the face normal oriented between 30° and 60° downwards optionally with neighboring separation units abutted against one another in a horizontally mirrored fashion. Hereby the gas separation structure in particular is protected from precipitation and falling atmospheric impurities—leaves, snow etc. Further in the angled orientation the diagonal formed by the axial depth and the height of the maximum envelope dimensions can be best utilized for the largest possible flow through cross section.

Furthermore the present invention relates to a method of operating a separation unit or an arrangement as detailed above, wherein the pair of sliding doors is positioned to seal one cavity of the array or is positioned in a neutral position outside of the array, while the other cavities of the array are open to transverse flow through to the gas mixture, the sealed cavity exposed to conditions so as to desorb and extract the gaseous component while the other cavities are driven by air propelling devices to adsorb the gaseous component from the gas mixture passing through, and once the desorption in the sealed cavity is terminated, the pair of sliding doors is shifted to a next cavity, preferably the one in the array which has been exposed to gas mixture adsorption for the longest time span at that moment, to seal that next cavity, and then this next cavity is exposed to conditions so as to desorb and extract the gaseous component while the other cavities are driven by air propelling devices to adsorb the gaseous component from the gas mixture, wherein preferably that sequence of steps is continued analogously to seal and extract sequentially all the cavities in the array and to cyclically iterate that sequence of adsorption and desorption steps equal to the number of cavities in the array at least once, preferably at least 100 times, or at least 500 or 1'000 times. Last but not least the present invention relates to a use of a separation unit, or an arrangement as detailed above, or of a method according to the preceding paragraph, for the separation of carbon dioxide and/or water vapor from ambient air.

The object of the present invention is therefore preferably to make available a DAC system based on flow through units offering the largest possible unimpeded through flow area, being individually sealable for gas separation processes, having a low possible thermal mass capable and being effectively grouped in repeating units.

So a separation unit for gas separation is presented enclosing at least one and preferably a plurality of enclosed spaces designated as cavities, said cavities being separated from one another by separation walls and further enclosed with transverse circumferential walls, further having at least one pair of axial doors with one door of each pair on the gas inlet and outlet faces of the unit respectively wherein said doors can move pairwise and transversely between the cavities, sealing the space they enclose and allowing gas to pass through the cavities which they do not isolate further wherein the space within the cavities can be occupied by a gas adsorption structure through which a gas flow is passed for adsorption of the component to be separated. For cases of a single cavity, the separation unit and the cavity are substantially forming the device.

For cases where the separation unit is to allow evacuation of the cavity to pressures less than atmospheric, this is intending to mean that the structure, if standing in an environment of ambient atmospheric pressure (around 1 atm, i.e. around 101,325 kPa), is able to withstand an internal pressure of pressures below 1000 mbar(abs), preferably being able to withstand an internal pressure of 700 mbar(abs), or of 500 mbar(abs) or of 100 mbar(abs) or more preferably of less than 10 mbar(abs). So the structure is provided to be able to withstand, e.g. pressures of e.g. in the range of 5-350 mbar(abs) or 5-200 mbar(abs) or even below that, e.g. 10 mbar(abs) or 5 mbar(abs). So the structure is preferably able to generally withstand underpressure differences between the outside and the interior space in the range of −0.3 bar(g) or −0.5 bar(g), preferably −0.95 bar(g), or −0.99 bar(g), or even −0.9999 bar(g), so close to or even around −1 bar(g) as well as overpressure differences of up to +0.1 bar(g) or up to +0.5 bar(g).

In the above description, by axial is meant the global direction of gas flow through the separation unit which could be in any direction leading through the depth direction of the separation unit including from bottom to the top of the unit or likewise from top to bottom and all other variants irrespective if the flow locally changes direction in the unit with transverse meaning substantially perpendicular to the global flow of gas through the separation unit and the cavity irrespective of local flow direction deviations and can therefore mean substantially horizontal or vertical or indeed any direction in between. Further in the above description gas separation is to be understood as the separation of a miscible gaseous species from a gaseous mixture and encompasses therefore gaseous streams such as air, flue, biological or geothermal gases or indeed any gaseous mixture.

The movable doors can have characteristic dimensions of (width, height and thickness) 0.6×0.6 m×0.05 m up to 12 m×3.8 m×0.3 m preferably 2 m×2 m×0.14 m and can, as the circumferential wall forming the cavities, be made of metals (in particular aluminum, iron, steel, stainless steel, carbon steel), composites, ceramics or plastics or combinations thereof.

Likewise, with the cavity not sealed from the gas flow by the moving door i.e. when opened to the gas flow—is characterized by a through flow cross section of characteristic dimension between 0.55×0.55 m up to 11.75 m×3.8 m and with a depth—the axial extension of the cavity between 0.1 m and 1.8 m, preferably between 0.2 m and 1.2 m. Overall, the envelope dimensions of a separation unit including doors can be limited substantially by those of an ISO 668 norm high top shipping container thereby enabling standardized, cost effective transport. It is to be understood by one skilled in the art, that such separation units can be combined to form larger systems by placing multiple separation units together and operating them as one plant.

The moving doors and cavities can be circular, hexagonal or rectangular in cross section and optionally, the doors may have reinforcing ribbing to prevent excessive deformation under pressure loads where such ribbing can have a spacing of 50-500 mm and a rib thickness of 2-20 mm.

In particular in the case of rectangular doors and cavities, the plane of the axial faces at the inlet and outlet of the separation unit can be reinforced with crossed tensile struts such as but not limited to cables, chains, rods or slats spanning the through-flow area and affixed to the load bearing structure—the circumferential and separation walls of the cavity—wherein the cross flow reduction of this feature compared to the completed cavity cross section is less than 10%, preferably less than 1% of the cavity flow through area. In this manner, well known from truss construction, transverse tilting of the separation unit under pressure loads or loads resulting from its own weight can be prevented. In another preferred embodiment of this same aspect, the gas separation structure can be affixed to a cavity along its circumferential and separating wall, the inner circumference of the cavity further optionally having a non-load bearing wire or plastic mesh or substantially gas permeable material with pores in the range of 0.5-10 mm. In this manner, the tilting loads can be carried by the gas separation structure without requiring a further stabilizing structure thereby preventing deformation of the entire separation unit while allowing for greater depth of the gas separation structure in the cavity as no further depth must be foreseen for stabilizing structures.

The doors can be moved pairwise in the transverse direction by different types of drive systems including, but not limited to belts, gears or winches with stepper or other motors wherein the position of the doors is controlled to stop at the cavity to be isolated.

The inlet faces can be provided with a gas plenum having dimensions of the characteristic dimensions of the separation unit and a depth of just somewhat larger than that of the movable door and characterized by a set of angled plates (louvres) extending along the entire transverse lengths of the separation unit or array from the side of the inlet gas flow with the main plane angled at 30-60° downwards from the horizontal or optionally adjustable from the horizontal to the completely vertical position. In this manner, the louvres can effectively close the gas inlet of the separation unit.

A fan for propelling the motion of gas preferably atmospheric air—can be placed in the axial wall of a gas plenum preferably on the gas outlet side of the separation unit wherein the minimum through flow area of plenum cross sections is minimum 20%, preferably minimum 50% of the flow cross section of a non-isolated cavity and said plenum is gas tight for the gas flow but not for pressure differences larger than 1000 Pa wherein no further separation of gas flow occurs and where said plenum can be made of material such as metals, plastics, composites or ceramic and optionally reinforced internally against external loads such as snow, ice, rain, wind etc.

One or both movable doors can be provided with a contact ring enclosing a form with the same shape as the cavity but having a characteristic dimension just somewhat larger than that of the cavity and in an isolating state contacting said ring in an axial direction with axial face of the separation unit. Said contact ring can be provided, on its axial surface with a full perimeter elastic sealing element such as an O-ring, profile seal on an edge profile, a sealing profile affixed per adhesive or any common gas seal profiles. The elastic sealing element has a cord diameter of 2-25 mm, preferably in the range of 3-15 mm. Also, the entire or parts of the axial face of the door axially opposed to the axial face of the cavity can be coated in an elastic material. An advantage of this preferred embodiment is that no explicit sealing structure (i.e. O-ring groove) must be manufactured which allows cost savings. Another advantage of this preferred embodiment is the thermal insulation afforded by such a coating, thereby reducing the effective thermal mass of the door in a temperature swing adsorption/desorption cycle.

At least one drive for establishing a seal of the movable doors on the axial cavity walls can be foreseen on the movable doors and engage with latches, levers or rails on the separation unit thereby translating the doors axially towards the outward axial walls of the separation unit thereby affecting the gas tight seal. Preferably these devices may include but are not limited to pneumatic or hydraulic drives or solenoids wherein preferably, from each cavity gas can be evacuated by any common vacuum system to achieve pressures of less than 1000 mbar(abs), preferably less than 200 mbar(abs) where in another preferred embodiment of the device, an initial rapid application of a vacuum system can provide a sufficient suction to realize the initial seal and enable further evacuation.

The separation unit may comprise further inlet/outlet elements for attaching at least one vacuum pump and/or for the extraction of gases and/or liquids from the cavity and/or for the introduction of further process media, in particular water and/or steam into cavities of the separation unit isolated by the door wherein preferably two inlet/outlet elements per cavity having dimensions of DN40-DN500 can be affixed on circumferential horizontal walls of the separation unit further wherein optionally said inlet/outlet elements are further connected to headers running the entire length of a single separation unit thereby connecting all cavities in said separation unit.

In further embodiment, the headers running the entire length of a single separation unit are formed by a first upper and lower circumferential horizontal walls with a second circumferential horizontal wall enclosing said space between the two circumferential walls with further openings in the first circumferential wall yielding access to individual cavities. According to yet another preferred embodiment therefore, at least one or preferably at least two of the wall elements or sections thereof forming the above-mentioned contiguous and sealing circumferential wall are double-walled so that the interspace between the two walls can be used as inlet/outlet elements for the introduction or extraction of media from the cavity. Preferably, in case of rectangular circumferential wall structures, the upper wall element and/or the lower wall element or preferably both are structured as double-wall structures, the interspace between the two walls available for this function. The advantage of this is that the interspace between the double-walled upper wall element of adjacent cavities and the interspace between the double-walled lower wall element of adjacent cavities can be interconnected so as to have one single conduit on an upper and/or lower space of the cavity.

A use of a separation unit as outlined above can be for a direct carbon dioxide capture process involving cycling between adsorption of carbon dioxide at ambient atmospheric temperatures and pressures and desorption of the carbon dioxide at reduced pressure below ambient atmospheric pressure, preferably at a pressure level of at most 1200 mbar(abs), and at an increased sorbent material temperature of 60-130° C. preferably 80-120° C. Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1A:
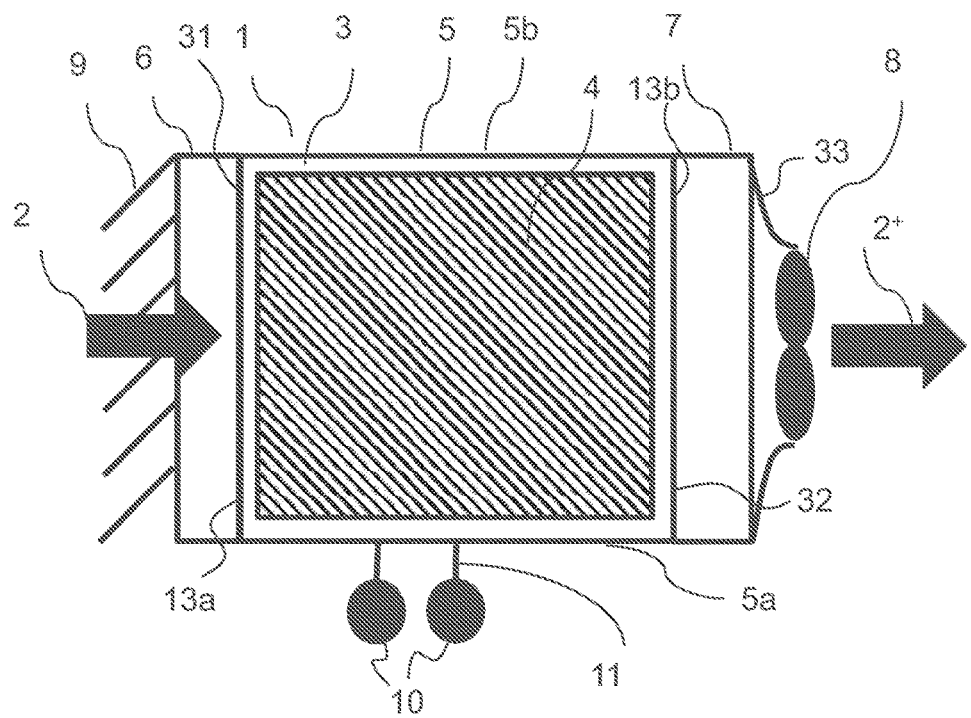
FIGS. 1a-1b shows a cross section of a separation unit/an arrangement in two possible orientations: (a) a single, vertically aligned separation unit, and (b), an arrangement of two tilted, symmetrically abutting separation units.

FIG. 1a shows a vertical cross section through a separation unit 1 used for example for direct air capture of atmospheric CO2, in which an air flow 2 through the separation unit 1 is substantially horizontal. Air flow 2 passes through louvres 9, through a first inlet gas plenum 6, through the upstream opening 31 at the upstream axial face 13a and into a cavity 3 containing a gas adsorption structure 4, before passing through a downstream opening 32 located at the downstream axial face 13b into a second outlet gas plenum 7 and out of the separation unit as outlet air flow $2^+$, driven by a fan 8 mounted in or at the outlet manifold 33.

Lead-in and lead-out collection piping 10 is connected by lead-in and lead-out piping 11 to individual cavity inlet/outlet elements to an individual cavity 3, and are in this example included in or attached to a lower circumferential wall 5a of the separation unit 1. It is also possible to tilt the separation unit shown in FIG. 1a by 90°, so that the air flow through the separation unit 1 is substantially vertical, either in an upward or in a downward flow direction.

Figure 1B:
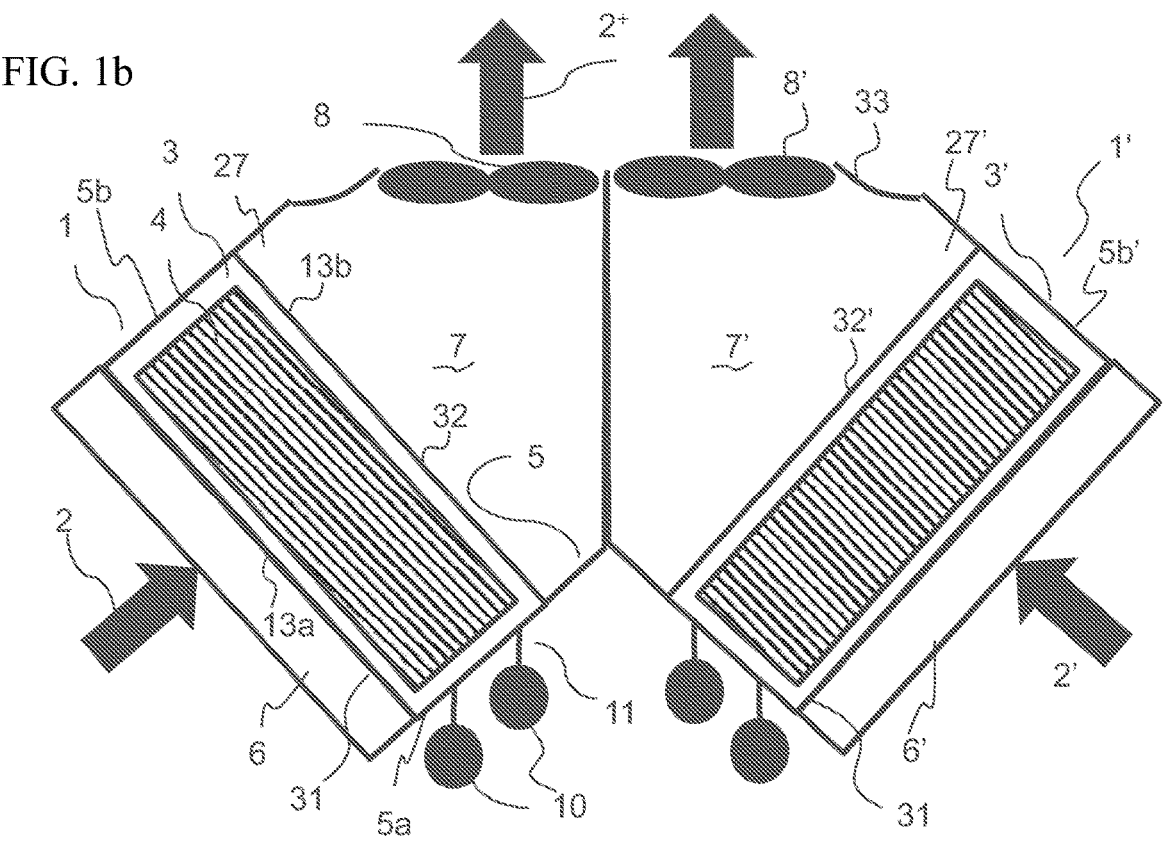

Another possible orientation of a separation unit 1 is shown in FIG. 1b. Here, the outlet air flow $2^+$ is substantially vertical and the separation unit 1 is oriented at an angle relative to a vertical direction (tilted). Such a separation unit 1 can be combined with a further horizontally mirrored and abutting separation unit P.

In this case, louvres 9 may also be omitted and the inlet air flow 2 can access directly via the inlet plenum 6, the upstream opening 31 at the upstream axial face 13a and the gas adsorption structure 4 inside the cavity 3.

A substantially triangular outlet gas plenum 7 starting at the downstream axial face 13b located at the downstream opening 32 is provided so as to afford the necessary outlet area and a propelling device—in this case a fan 8—is housed at the exit of the outlet gas plenum 7 in an outlet manifold 33.

In FIG. 1b, two outlet plenums 7 and 7' are shown; however, the two outlet plenums 7 and 7' can also be combined as one joint outlet plenum, i.e. without separation wall between them and instead of two propelling devices (8, 8') or two corresponding rows of propelling devices (8, 8') in the viewing direction there could also be one single, centered propelling device (or row of propelling devices in the viewing direction).

As in FIG. 1a, the separation unit 1 is connected with lead-in and lead-out collection piping 10 connected by lead-in and lead-out piping 11 to the cavity 3 in or at the lower circumferential wall 5a.

It is to be understood that the pair of movable sliding doors 12 are not illustrated in these views of FIGS. 1a-1b, as they are not in the plane of the section shown. They would move within the inlet 6 and outlet 7 plenums, would be oriented perpendicular to the inlet air flow directions 2 and $2^+$, and in case of the arrangement of FIG. 1b, the upstream movable sliding doors are located in the inlet plenum 6 and 6' and the downstream movable sliding doors are arranged parallel to the upstream movable sliding doors in the sliding door region 27 of the outlet gas plenum 7 essentially right downstream of the gas adsorption structure 4.

Further, in FIGS. 1a and 1b separation units 1, 1' respectively with only one cavity 3 each are shown, but there are normally at least two cavities per separation unit adjacent and essentially next to each other in a direction parallel to the viewing direction. Further the concept can be extended to any number of separation units by stacking units in the case of vertically aligned arrangement or abutting units in the case of the tilted arrangement.

In particular, for the case of the arrangement of FIG. 1b, if at least two cavities per separation unit are used, the outlet plenums 7 and 7' (or the joint outlet plenum as described above) can be formed the way so that they form one (or two parallel) joint outlet plenums over each separation unit and in this case the individual air propelling devices do not need to be each assigned to one cavity and the number of air propelling devices per separation unit does not necessarily need to match the number of cavities in that separation unit.

Figure 2:
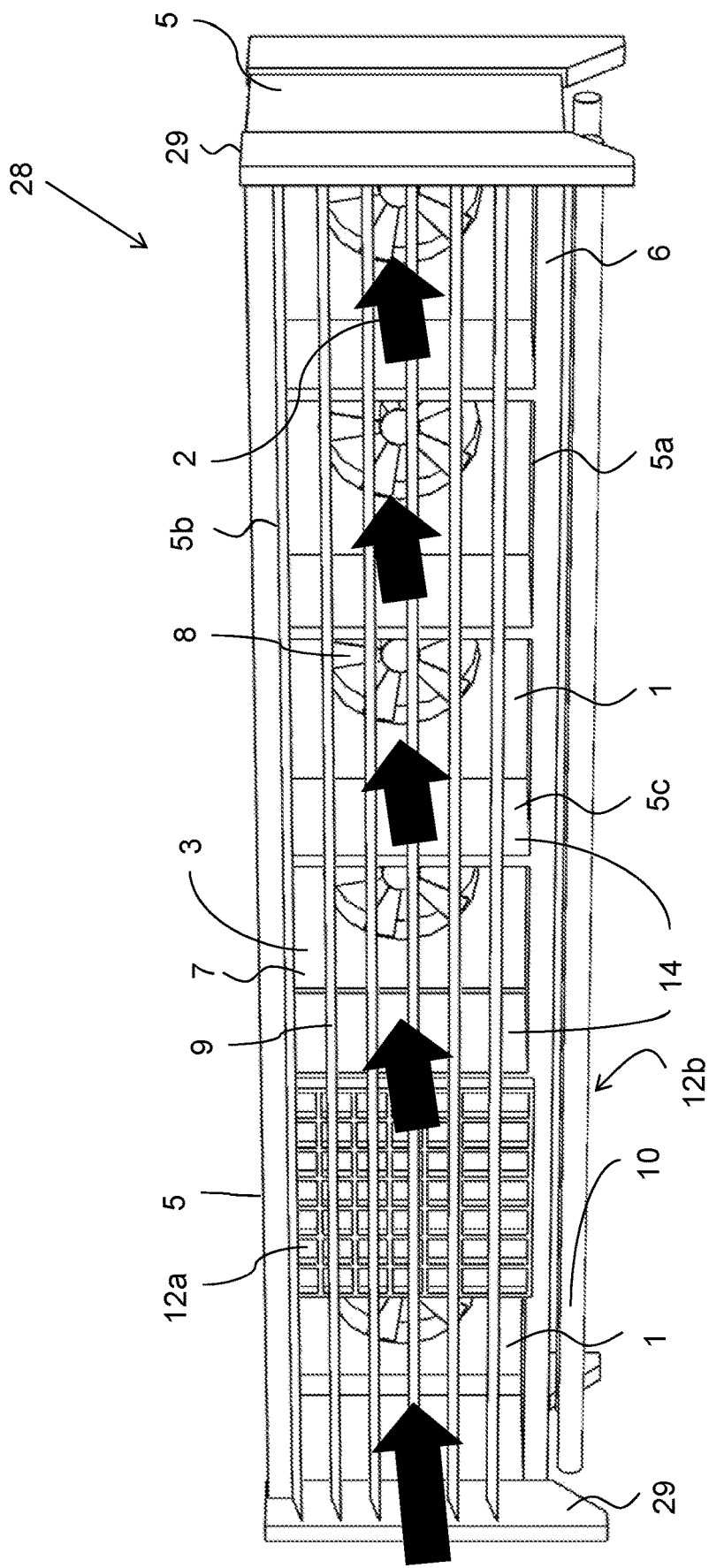
FIG. 2 shows a perspective view of a separation unit containing an array of six cavities and one pair of horizontally translating doors (only the front one illustrated) and without gas adsorption structures to illustrate the position of the movable door, of the cavities, and the louvres.

FIG. 2 shows a perspective view of a possible separation unit 1 containing an array 28 of six adjacent cavities 3, formed by the circumferential walls 5a, 5b and 5c, the latter being in case of adjacent cavities given by the separation walls 14, where, in the representation, the second cavity from the left is sealed by a pair of square shape movable doors (only the upstream door 12a is illustrated) located in the inlet plenum and the remaining five cavities are exposed to a gas flow 2 passing in this case through louvres 9 affixed on a sidewall 29 and driven by a fan 8. The (not illustrated) downstream door 12b is located in the downstream plenum 7. At the base of the separation unit, in or at the bottom circumferential wall 5a, a pair of lead-in and lead-out collection pipes 10 are provided for media transport to or from individual cavities 3.

In this particular preferred embodiment the sidewalls of each of the cavities 3 as illustrated are made of steel or stainless steel or carbon steel of a thickness of 8 mm and have an axial length (in the flow through direction) in the range of 1.8 m. The cavities have in this case an internal height of typically 2.1 m and an internal width of 2.1 m. The sliding door can be realized with dimensions of height and width of 2.2 m×2.2 m being made of steel, stainless steel, or carbon steel with material thickness 8 mm, having ribbing of depth 0.16 m with material thickness 5 mm with said ribbing being welded to the door plate with spacing of 0.2 m between ribs in both axes of the plane of door.

The separation unit 1 as illustrated in FIG. 2 can be operated as follows: in this scenario as given in this figure, the second cavity from the left is sealed by the upstream sliding door 12a and the downstream sliding door 12b. The lead in piping 11 is closed by a valve and the lead out piping 11 is used for evacuating that cavity. At the same time this cavity can be heated, which can take place by the introduction of heating liquid into corresponding piping located in the cavity and/or in the gas adsorption structure 4 and/or by introducing hot steam by a lead in piping 11.

Also possible during or after or instead of evacuation and/or heating is the introduction of steam or other gases as a purge gas flow, and for extraction of the carbon dioxide lead out piping 11 used and the carbon dioxide is extracted from the cavity. Therefore, the extraction of the carbon dioxide can be performed with or without vacuum depending on the process configuration. While this process takes place in the second cavity from the left, the fan 8 of the second cavity from the left is not operating, or, preferably, operating at reduced speed as further described below, while the other fans are operating, and the first cavity from the left and the four cavities from the right are open to flow through and for adsorption of carbon dioxide.

Once the carbon dioxide extraction step in the second cavity from the left is terminated, and, optionally, the second cavity from the left has been allowed to reach ambient temperature and/or ambient pressure again, the pair of sliding doors is moved for example to cover the first cavity from the left and is manipulated to seal that first cavity from the left. The throughput of the fan of that first cavity from the left is reduced, while that of the fan of the second cavity from the left is increased. This reduction in power of the neighboring fans to the actively adsorbing cavity without a complete stop is preferred as otherwise air would be aspirated through the stopped fan into the outlet plenum 7, reducing the adsorbate uptake. Now the operations as described above for the second cavity from the left is carried out for the first cavity from the left, while the other cavities are subjected to flow through for carbon dioxide adsorption from ambient air. In the next cycle typically the pair of sliding doors is moved to seal the cavity at the very right position in the illustration, assuming that that is the cavity which has been exposed to flow through of ambient air for the longest amount of time at that moment.

The cycle is continued so that the sliding doors after having sealed the first cavity from the right, will then travel to the second cavity from the right and seal that cavity, to the third cavity from the right, and so on. Like that a cycling process takes place in which as little as possible structural elements are present for operating as many adsorption cavities as possible, in an optimal way considering that typically the adsorption step takes longer than the desorption steps. As a matter of fact, the number of cavities arranged in such an array can be adapted to the temporal ratio for adsorption and desorption. If for example adsorption and desorption take the same amount of time, an array of two cavities adjacent to each other can be most appropriate. Optimum operation forward as illustrated in FIG. 2 is given if the temporal ratio for adsorption and desorption is 5:1.

This optimum temporal ratio may be foregone or loosened by providing a hold or neutral position outside of the array, which allows uncoupling the process timing from the configuration of the cavities and array, as the doors may be placed in this position if no closing of a cavity is needed, thus allowing for any desorption and adsorption timing.

Figure 3:
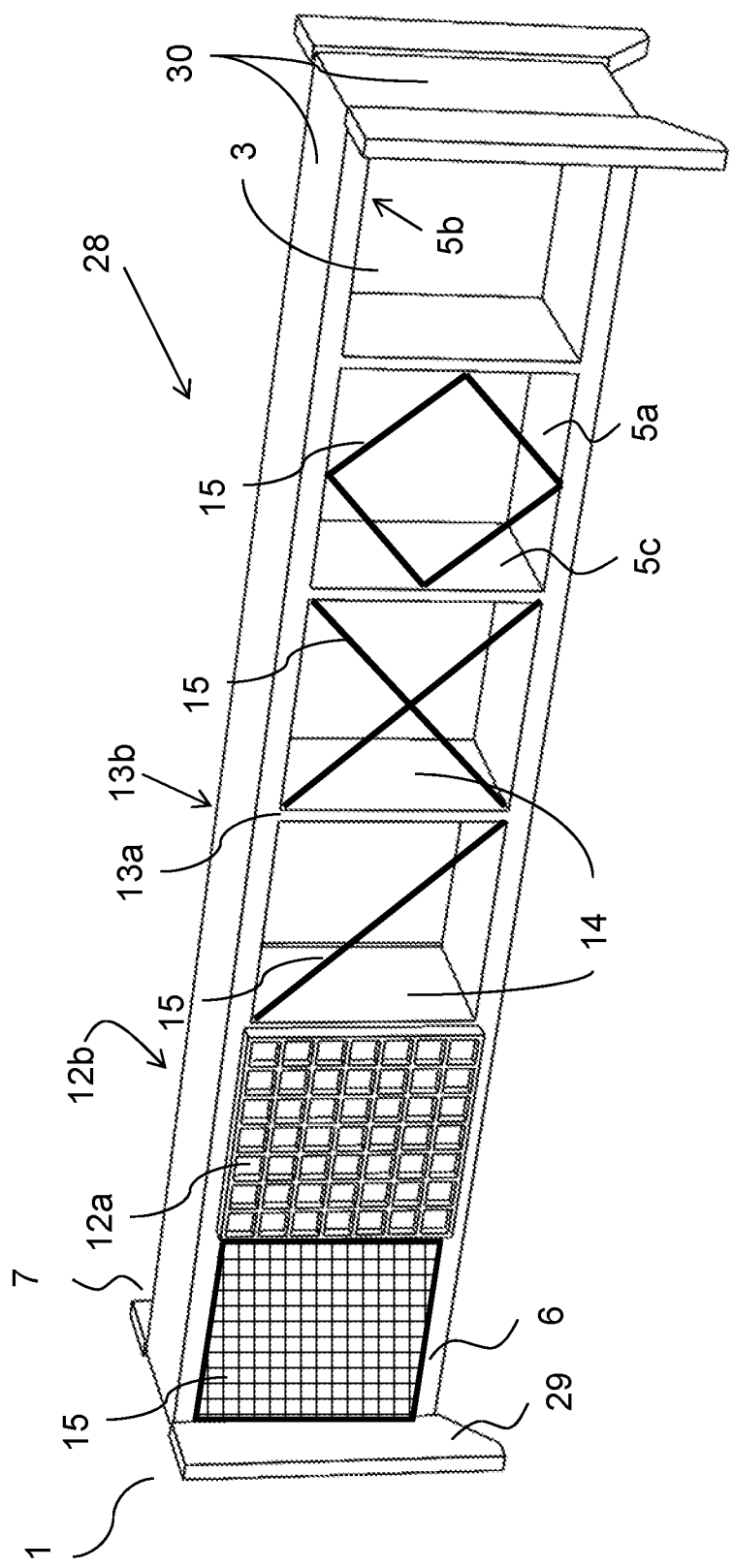
FIG. 3 shows a perspective view of a separation unit containing an array of six cavities and one pair of horizontally translating doors (only the front one illustrated) without gas adsorption structures and with different stabilizers in/at the individual cavities.

FIG. 3 shows details of a variant of the frame element 30 of a possible separation unit 1 containing an array 28 of six cavities 3 separated by separation walls 14 and thus enclosed each by circumferential walls 5a, b, and c, with a pair of movable doors 12a and b (only upstream door shown) abutting against the upstream and downstream faces 13a and b, respectively, for sealing, in this case sealing the second cavity from left. In or at some of the cavities there are shown different embodiments of stabilizers 15 based on truss constructions formed by various combinations of cross struts affixed in the cavity 3 to the circumferential 5 and separation walls 14 or, as in the first cavity from left, a gas permeable sheet spanning the cavity cross section which may also be an element of a gas adsorption structure. Optionally, depending on the required pressure range and size of the separation unit 1, there may be no stabilizers required as in the rightmost cavity.

Figure 4A:
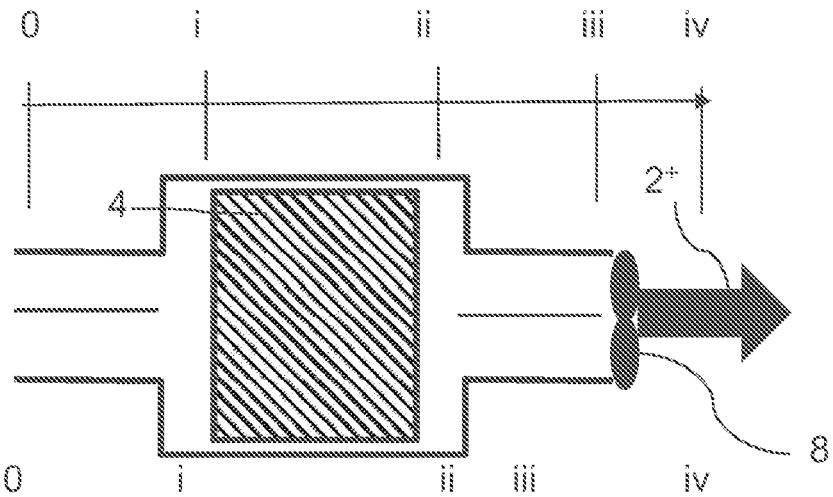
FIGS. 4a-4c shows the pressure drop distribution along the airflow direction for a DAC unit of the prior art and of this invention.
Figure 4B:
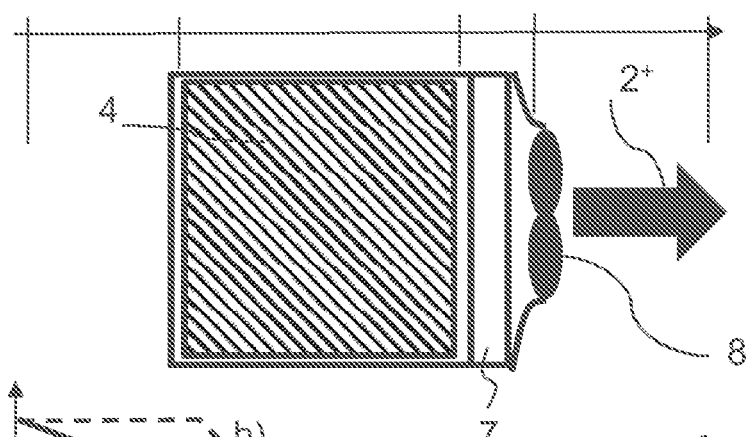
Figure 4C:
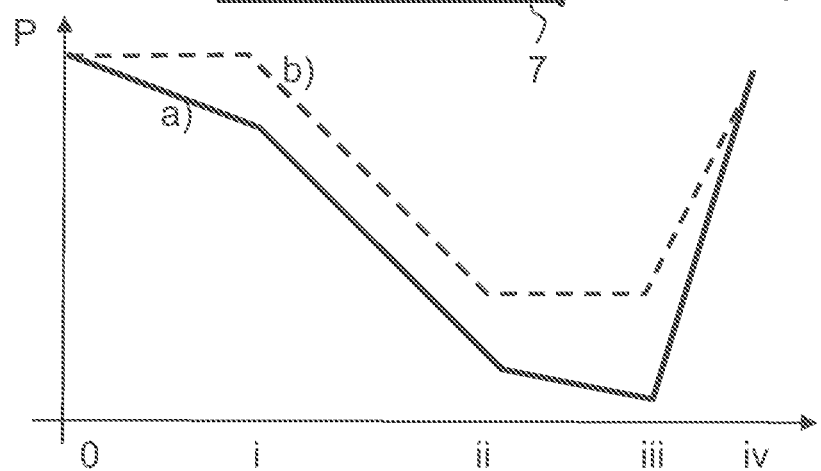

FIGS. 4a and 4b show the relevant positions (0-iv) for pressure drop consideration under conditions of airflow 2 for a DAC unit of the prior art and the separation unit of this invention respectively. FIG. 4c) shows the resulting pressure profiles for the two units operating with the same fans 8 and the same gas adsorption structures 4. Both units begin aspirating air at atmospheric pressure at point 0 however the inclusion of ducting in the prior art unit of FIG. 4 a) immediately produces a pressure drop whereas the unit of this invention maintains the pressure level virtually unchanged up to point i where the air hits the gas adsorption structure 4. Over the gas adsorption structure (points i-ii) the main drop in pressure occurs before the fan 8 increases the pressure again to atmospheric level. Because the fan 8 of the unit in FIG. 4a) must overcome a pressure drop composed of that of the gas adsorption structure 4 and ducting—including any lids, actuators and flow restrictions—the resulting air flow is defined by a composed pressure drop and is correspondingly larger than in the case of FIG. 4b) where the fan must substantially only overcome the pressure drop of the gas adsorption structure. Correspondingly, the air flow in the case of FIG. 4b) and uptake rate of CO2 is higher than the case of FIG. 4a).

Figure 5:
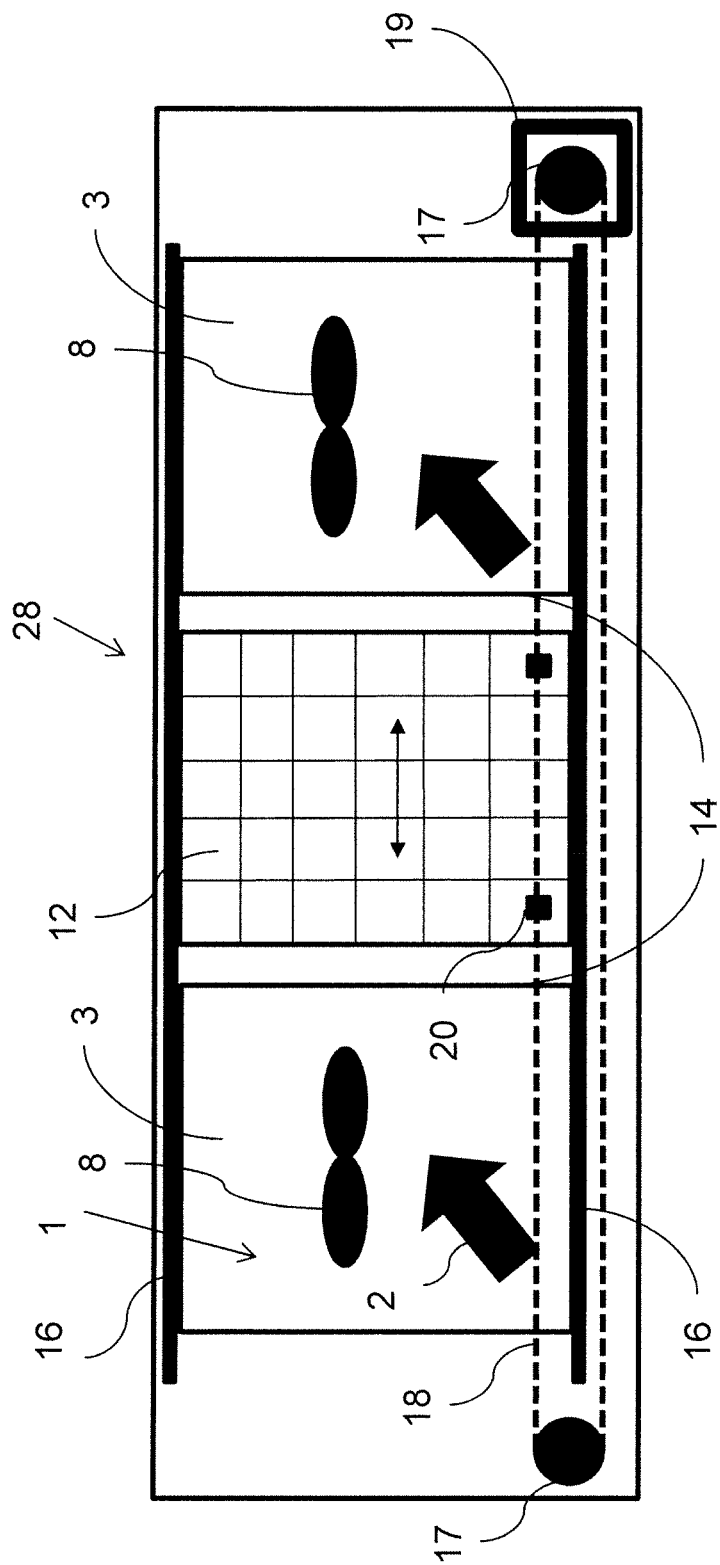
FIG. 5 shows details of a mechanism for transverse motion of a sliding door between individual cavities of an array within a separation unit.

FIG. 5 shows details of a possible drive mechanism of a separation unit 1 for the transverse motion of a door 12 between in this case three cavities 3 of an array 28 wherein the outer two of the cavities 3 are exposed to an airflow 2 propelled by a fan 8 each. The door 12 is guided and carried in upper and lower rails 16 affixed to the frame 30 of the array 28 to restrict its motion only in the transverse direction and further attached to a drive belt 18 by one or a pair of latches 20. The belt 18 is travelling on two pulleys 17 where at least one pulley is driven by an electric stepper motor 19. The door 12 as indicated can move to the left as well as to the right.

Figure 6:
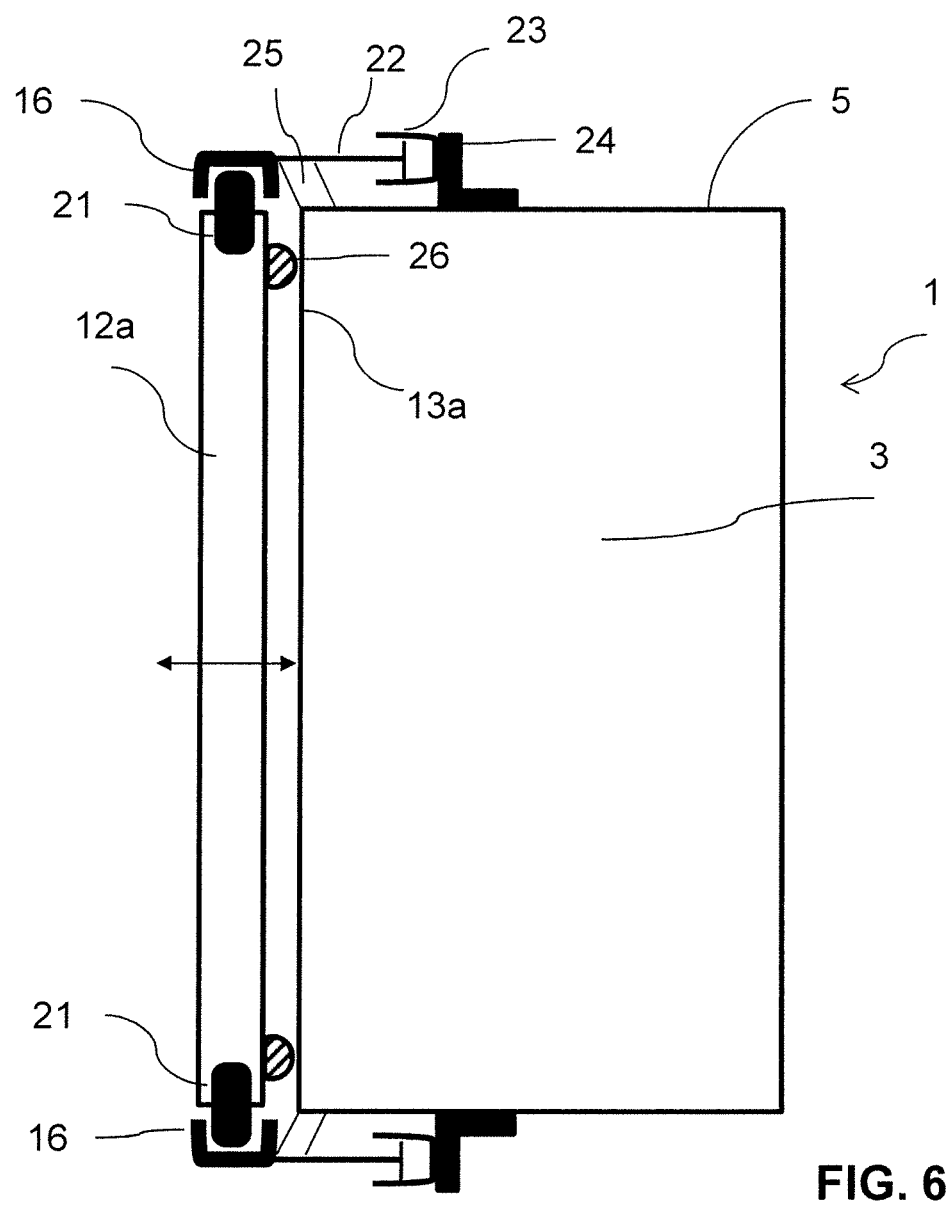
FIG. 6 shows details of a mechanism for providing a gas tight seal between the door and axial face of the separation unit.

FIG. 6 shows details of one possible mechanism for sealing of a movable door 12 against the upstream face 13 of the frame of the separation unit 1. In this figure the unit is depicted from the side and only shows the upstream movable door 12a having upper and lower rollers 21 housed in C formed rails 16 affixed by means of a rod 22 to a pneumatic drive 23 further affixed by means of an L bracket 24 to the circumferential wall 5 of the separation unit 1 wherein the contraction of the pneumatic drive 23 pulls the C rail 16 and correspondingly the upstream door 12a towards the upstream face 13a contacting the sealing ring 26 (shown in a sectional view) with the upstream face 13a and providing the seal for sealing of the cavity 3, internal to the separation unit 1. The C rails 16 are further supported and guided in their motion by a pair of rods 25 forming a 4 bar linkage. Although only one door is shown (on only one side of the separation unit for example in this case the gas inlet upstream side), it is to be understood that the same mirrored mechanism can be applied to the other side of the separation unit.

Figure 7:
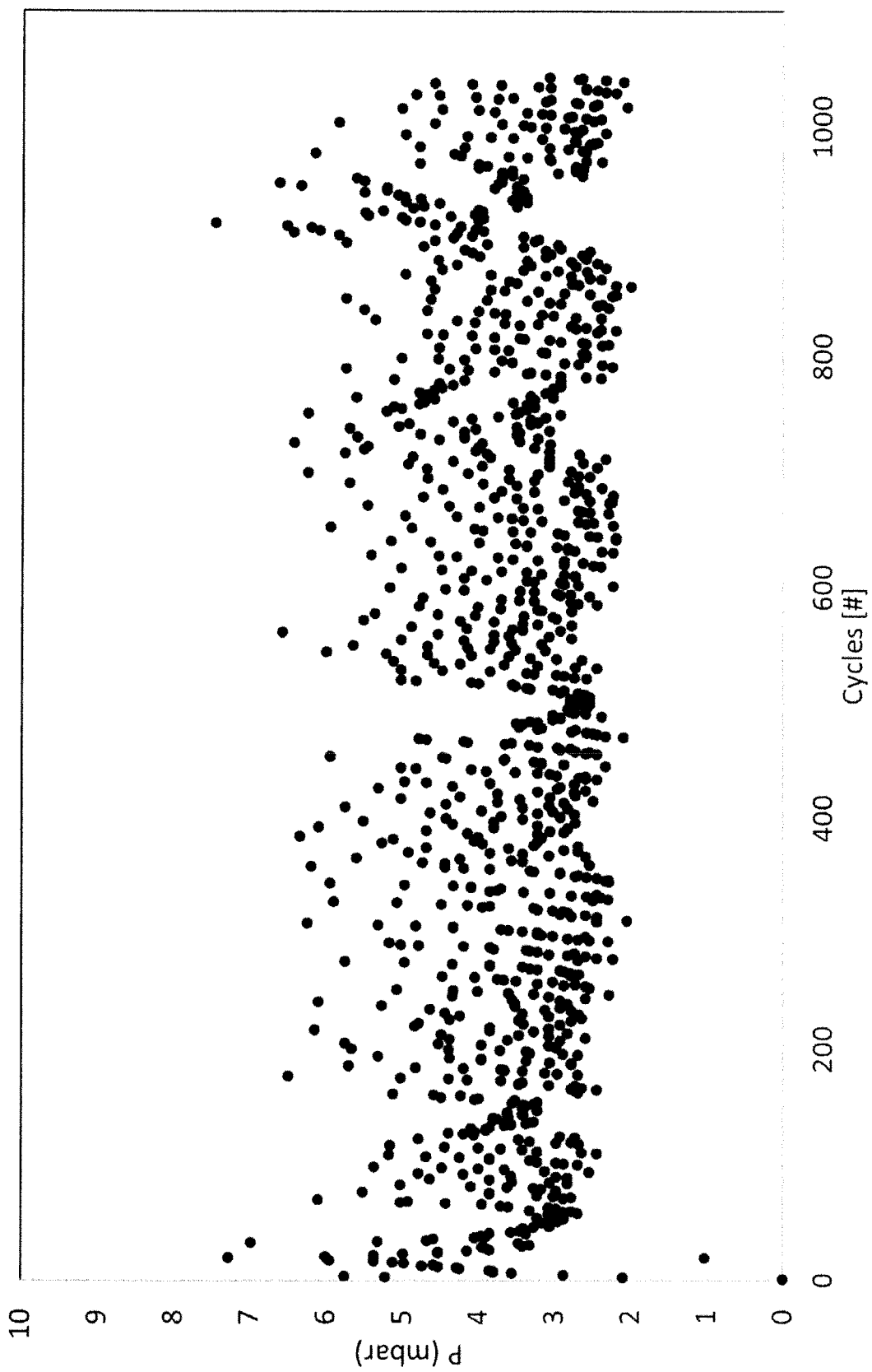
FIG. 7 shows the pressure increase within a cavity of a separation unit with a movable doors operating under repeated vacuum evacuations and holds over 1'000 cycles.

FIG. 7 shows the results of long term testing of one possible arrangement of a separation unit consisting of a movable door with dimensions 2.2×2.2 m and an array of two vacuum cavities. The pair of doors was moved repeatedly between the cavities by a belt drive with a seal being set on the axial faces of the separation unit with a set of pneumatic drives. Further the cavity was evacuated from atmospheric pressure to 100 mbar(abs) followed by a 15 min pressure hold before the cavity was re-pressurized, the door moved to the second cavity and the evacuation and pressure hold repeated. The separation unit was operated in an ambient atmospheric environment for more than 1'000 cycles with FIG. 7 showing the final increase in pressure at the conclusion of the pressure hold—so the leakage of air into the evacuated vacuum cavity. It is firstly seen that this rise is over all cycles less than 10 mbar and lies well within the limits designated for the system and secondly the rise remains virtually unchanged between the first and last cycle proving the cyclic stability and robustness of the separation unit.

Example 1. Amount of material and material intensity for temperature vacuum swing direct air capture device.

Table 1 shows the amount of material and the material intensity of one possible realization of a separation unit containing an array of six adjacent cavities with one horizontally sliding door pair. This is compared with a separation device consisting of six individual units of the prior art according to WO-A-2015185434. Both variants are in this example realized within the envelope dimensions of a 40 foot ISO 668 shipping container.

TABLE 1

|  | Enclosed volume (m3) | Structural material mass (kg) | Material intensity (kg/m3) |
| --- | --- | --- | --- |
| This invention | 26 | 9000 | 350 |
| Prior Art | 21 | 12000 | 570 |

It is seen that this invention has a 40% lower material intensity (where the material intensity describes the specific amount of structural material mass needed to enclose a certain volume that can be used for the adsorption structure) leading to a significant cost saving for manufacture. Further, particularly for direct air capture processes utilizing temperature swings, the corresponding reduced thermal mass represents a significant energy saving.

Figure 8:
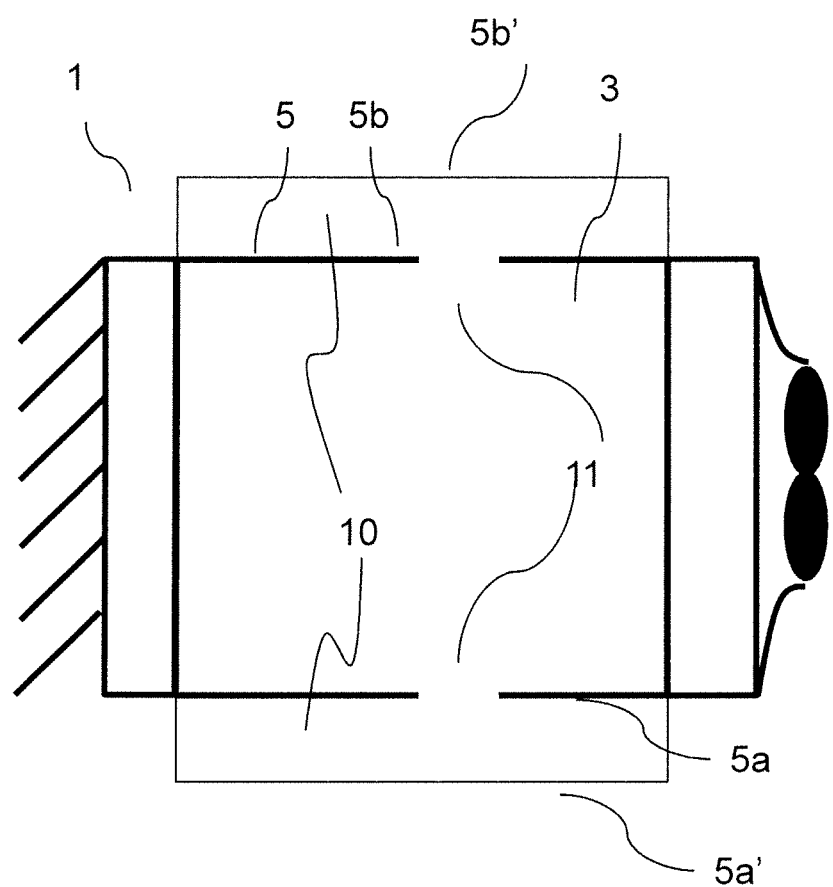
FIG. 8 shows the usage of double circumferential horizontal walls as headers for the transport of media to and from a cavity of separation unit.

FIG. 8 shows one possible variant of the separation unit 1 comprising a cavity 3 formed by circumferential walls 5. The lower and upper circumferential wall 5a and 5b form with a second lower and upper circumferential walls 5a' and 5b' respectively in the form of double-walled elements a space which forms a header 10 where media can flow to and from the cavity 3 through a lead-in or lead-out 11. In this fashion, the structure of the separation unit can be doubly used for carrying structural loads and containing media.

| List of Reference Signs | |
| --- | --- |
| 1 | separation unit |
| 2 | inlet gas/air flow |
| 2+ | outlet gas/air flow |
| 3 | cavity |
| 4 | gas adsorption structure |
| 5 | circumferential walls of 5 |
| 5a | lower circumferential wall of 5 |
| 5a' | second lower circumferential wall of 5 |
| 5b | upper circumferential wall of 5 |
| 5b' | second upper circumferential wall of 5 |
| 5c | lateral circumferential wall of 5 |
| 6 | inlet gas plenum |
| 7 | outlet gas plenum |
| 8 | air propelling device, fan |
| 9 | louvres |
| 10 | lead-in and lead-out collection piping/interspaces |
| 11 | lead-in and lead-out piping to individual cavities |
| 12 | sliding door |
| 12a | upstream sliding door in 6 |
| 12b | downstream sliding door in 7 |
| 13a | upstream axial face |
| 13b | downstream axial face |
| 14 | separation walls |
| 15 | stabilizers |
| 16 | rail, e.g. C rail |
| 17 | pulley |
| 18 | belt |
| 19 | stepper motor |
| 20 | latch |
| 21 | wheel |
| 22 | rod |
| 23 | pneumatic drive |
| 24 | L profile |
| 25 | 4 bar linkage rods |
| 26 | sealing ring |
| 27 | sliding door region of 7 |
| 28 | separation unit with array of cavities |
| 29 | sidewall for 6 |
| 30 | frame of the array 28 |
| 31 | upstream opening |
| 32 | downstream opening |
| 33 | outlet manifold |

The invention claimed is:

1. A separation unit for separating at least one gaseous component from a gas mixture containing that component, wherein the separation unit comprises:
at least one contiguous and sealing circumferential wall element, circumferentially enclosing at least one cavity,
said at least one contiguous and sealing circumferential wall element defining an upstream opening and an opposed downstream opening of said at least one cavity, said cavity containing at least one gas adsorption structure for adsorbing said at least one gaseous component,
wherein the separation unit further comprises a pair of opposing sliding doors for sealing the upstream opening and the downstream opening, respectively, of at least one cavity in a closed state, and
wherein each of the pair of opposing sliding doors, to open the closed cavity, is shifted in a direction essentially parallel to the plane of the respective sliding door to uncover the upstream and downstream opening, respectively and to allow for flow through of gas mixture through the gas adsorption structure,
wherein the separation unit contains an array of at least two cavities with circumferential wall elements enclosing the cavities and each housing respective gas adsorption structures, wherein said pair of opposing sliding doors is mounted to allow for alternatingly sealing one cavity of the separation unit as well as the other cavity(ies),
and wherein the separation unit is attached to or encompasses only one common evacuation unit, or only one common heating unit, or only one common collection unit for the gaseous component, or only one common drive at the upstream side and the downstream side for the doors, or only one set of louvres at the upstream side, in each case common for all cavities, while for each cavity an individually controllable gas or air propelling device is provided at the downstream side.

2. The separation unit according to claim 1, wherein the separation unit allows for evacuating the at least one cavity in a closed state to a pressure of at most 700 mbar(abs) or to a pressure of less than 500 mbar(abs), or to a pressure of less than 300 mbar(abs) or to a pressure of less than 150 mbar(abs) or at most 100 mbar(abs);
or wherein the separation unit allows for putting the at least one cavity in a closed state under an overpressure of at up to 0.1 bar(g) or of up to 0.2 bar(g) or up to 0.5 bar(g).

3. The separation unit according to claim 1,
wherein the separation unit comprises at least one set of four contiguous and sealing circumferential wall elements, a lower wall element, an opposed upper wall element and two opposed lateral circumferential wall elements joining corresponding ends of the upper and lower wall element, and circumferentially enclosing said at least one cavity, said set of four contiguous and sealing circumferential wall elements defining the upstream opening and the opposed downstream opening;
or
wherein the separation unit comprises at least one set of eight contiguous and sealing circumferential wall elements, at least one lower wall element, at least one opposed upper wall element and at least two opposed lateral circumferential wall elements joining corresponding ends of the upper and lower wall element directly or via oblique further wall elements, and circumferentially enclosing said at least one cavity, said set of eight contiguous and sealing circumferential wall elements defining the upstream opening and the opposed downstream opening; or
wherein the separation unit comprises at least one single circular or oval circumferential wall element circumferentially enclosing at least one cavity.

4. The separation unit according to claim 3, wherein the upper and lower wall elements are arranged parallel to each other, the lateral wall elements are arranged parallel to each other.

5. The separation unit according to claim 1, comprising, at the upstream opening of at least one cavity, or in case of more than one cavity of the multitude of cavities, an inlet gas plenum, in which an upstream sliding door is located, and at the downstream opening an outlet gas plenum, in which a downstream sliding door is located.

6. The separation unit according to claim 1, wherein one or both sliding doors are mounted on a pair of upper and lower rails.

7. The separation unit according to claim 1,
wherein the sliding door or the respective opening of at least one cavity is provided with at least one circumferential sealing element, or
wherein means to allow pressing the respective door to a corresponding axial face and to free the respective opening to distance the door again are provided by a pair of upper and lower rails being mounted on a frame or the circumferential walls in an axially shiftable manner,
or wherein the pair of sliding doors is driven each by a belt on a pair of pulleys.

8. Separation unit according to claim 1, wherein the axial length of the circumferential wall element(s) is smaller than the minimum distance between opposing circumferential wall element(s),
or wherein the circumferential wall encloses a rectangular or square cross section and the pair of sliding doors is correspondingly rectangular or square, or
wherein a sliding drive of the pair of doors is made to allow synchronous pairwise movement of the doors.

9. The separation unit according to claim 1,
comprising at least one stabilising element, at or in the at least one cavity, or
wherein at least one sliding door comprises stabilising elements.

10. The separation unit according to claim 1, containing an array of at least three, or at least four or in the range of 2-8 or 2-6 cavities with circumferential wall elements enclosing the cavities and each housing respective gas adsorption structures, wherein said pair of opposing sliding doors is mounted to allow for alternatingly sealing one cavity of the separation unit as well as the other cavity(ies).

11. The separation unit according to claim 10, wherein the cavities of the array are arranged adjacent to each other in one or more rows, and wherein circumferential wall elements of adjacent cavities are formed by common separation walls.

12. The separation unit according to claim 1,
wherein it is attached to or encompasses only one common evacuation unit, or only one common heating unit, or only one common collection unit for the gaseous component, or only one common drive at the upstream side and the downstream side for the doors, or only one set of louvres at the upstream side, in each case common for all cavities, or wherein it contains one single frame forming the circumferential wall elements of all cavities.

13. A method of operating a separation unit or an arrangement of separation units according to claim 1 and containing an array of cavities,
wherein the pair of sliding doors is positioned to seal one cavity of the array while the other cavities are open to flow through to the gas mixture, the sealed cavity is exposed to conditions so as to desorb and extract the gaseous component while the other cavities are driven by gas or air propelling devices to adsorb the at least one gaseous component from the gas mixture, and once the desorption in the sealed cavity is terminated, the pair of sliding doors is shifted to a next cavity, to seal that next cavity, and then this next cavity is exposed to conditions so as to desorb and extract the gaseous component while the other cavities are driven by gas or air propelling devices to adsorb the at least one gaseous component from the gas mixture.

14. A method of using a separation unit, according to claim 1 or an arrangement or an array thereof for the separation of carbon dioxide and/or water vapor from ambient air.

15. The separation units according to claim 10, wherein said each cavity contains at least one gas adsorption structure for adsorbing said at least one gaseous component under ambient pressure and/or temperature conditions.

16. The separation unit according to claim 1, wherein the separation unit comprises at least one set of eight contiguous and sealing circumferential wall elements, at least one lower wall element, at least one opposed upper wall element and at least two opposed lateral circumferential wall elements joining corresponding ends of the upper and lower wall element directly or via oblique further wall elements, forming an hexagonal or octagonal structure, and circumferentially enclosing said at least one cavity, said set of eight contiguous and sealing circumferential wall elements defining the upstream opening and the opposed downstream opening.

17. The separation unit according to claim 3, wherein the upper and lower wall elements are arranged parallel to each other, the lateral wall elements are arranged parallel to each other, and also the pair of opposing sliding doors is arranged parallel to each other.

18. The separation unit according to claim 1, wherein it comprises, at the upstream opening of at least one cavity, or in case of more than one cavity of the multitude of cavities, an inlet gas plenum, in which an upstream sliding door is located, and at the downstream opening an outlet gas plenum, in which a downstream sliding door is located, wherein in case of more than one cavity the inlet gas plenum and/or the outlet gas plenum are common to all cavities.

19. The separation unit according to claim 5, wherein upstream of the inlet gas plenum or forming the entry of the inlet gas plenum one or a set of static or movable louvres or at least one gas or air propelling device is provided.

20. The separation unit according to claim 19, wherein downstream of the outlet gas plenum or forming the outlet of the outlet gas plenum, in an outlet manifold at least one gas or air propelling device, in the form of a fan, is mounted or one or a set of static or movable louvres is provided.

21. The separation unit according to claim 1, wherein one or both sliding doors are mounted on a pair of upper and lower rails, including C rails, wherein the doors are travelling in or on these rails with rollers.

22. The separation unit according to claim 21, wherein means are provided which allow to press the respective door to a corresponding axial face of the respective opening at the position for closing, and to distance the door again from that sealing position to allow for sliding the door to free the respective opening.

23. The separation unit according to claim 6,
wherein the sliding door or the respective opening of at least one cavity is provided with at least one circumferential sealing element, in the form of at least one sealing ring and/or in the form of a sealing coating, or
wherein the means to allow pressing the respective door to a corresponding axial face and to free the respective opening to distance the door again is provided by a pair of upper and lower rails being mounted on a frame or the circumferential walls in an axially shiftable manner, by way of a hydraulic or pneumatic drive.

24. The separation unit according to claim 1,
wherein it comprises at least one stabilising element, in the form of at least one stabilising strut, at or in the at least one cavity, or wherein at least one, or both sliding doors comprise stabilising elements, in the form of ribbing.

25. The separation unit according to claim 10,
wherein the cavities of the array are arranged adjacent to each other in one or more rows, and wherein circumferential wall elements of adjacent cavities are formed by common separation walls, and
wherein the cavities of the array are arranged in one single horizontal or vertical row and directly adjacent to each other.

26. The method according to claim 13, wherein once the desorption in the sealed cavity is terminated, the pair of sliding doors is shifted to a next cavity, which is the one in the array which has been exposed to gas mixture adsorption for the longest time span, to seal that next cavity.

27. The method according to claim 13, wherein that sequence of steps is continued analogously to seal and extract sequentially all the cavities in the array and to cyclically iterate that sequence of adsorption and desorption steps equal to the number of cavities in the array at least once, or at least 100 times, or at least 1,000 times.

28. An arrangement of two separation units, wherein each separation unit is a separation unit for separating at least one gaseous component from a gas mixture containing that component,
wherein each separation unit comprises:
at least one contiguous and sealing circumferential wall element, circumferentially enclosing at least one cavity, said at least one contiguous and sealing circumferential wall element defining an upstream opening and an opposed downstream opening of said at least one cavity, said cavity containing at least one gas adsorption structure for adsorbing said at least one gaseous component,
wherein each separation unit further comprises a pair of opposing sliding doors for sealing the upstream opening and the downstream opening, respectively, of at least one cavity in a closed state, and
wherein each of the pair of opposing sliding doors, to open the closed cavity, is shifted in a direction essentially parallel to the plane of the respective sliding door to uncover the upstream and downstream opening, respectively and to allow for flow through of gas mixture through the gas adsorption structure,
wherein the two separation units) are arranged in a V orientation, the respective upstream openings facing in an oblique downwards/sideward direction and the respective downstream openings facing in an oblique upwards/sideward direction and the respective downstream openings facing in an oblique way each other.

29. The arrangement of two separation units according to claim 28, wherein the two separation units are arranged in a V orientation, the respective upstream openings facing in an oblique downwards/sideward direction and the respective downstream openings facing in an oblique upwards/sideward direction and the respective downstream openings facing in an oblique way each other, and at least one gas or air propelling device being arranged to propel the gas mixture travelling through the separation units in a substantially vertically upward direction.

* * * * *